July 29, 1941.　　　　S. YAMASHITA　　　　2,250,786
MANIFOLD OF AN INTERNAL COMBUSTION ENGINE
Filed Feb. 14, 1940
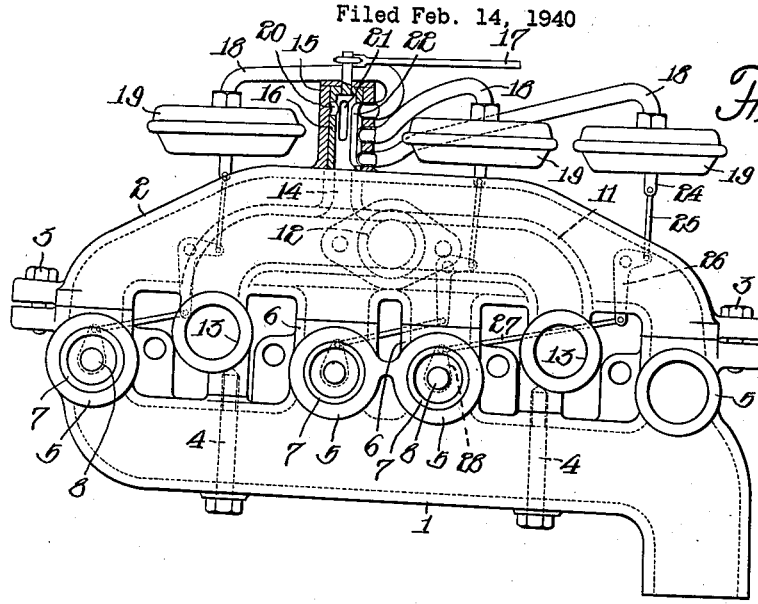
INVENTOR:
SONOSUKE YAMASHITA
BY Haseltine, Lake & Co.
ATTORNEYS Patented July 29, 1941

2,250,786

UNITED STATES PATENT OFFICE 2,250,786

MANIFOLD OF AN INTERNAL COMBUSTION ENGINE

Sonosuke Yamashita, Ushigome-ku, Tokyo, Japan

Application February 14, 1940, Serial No. 318,788

2 Claims. (Cl. 123—122)

The present invention relates to improvements in the manifold of an internal combustion engine, which consists in providing the main exhaust manifold of an internal combustion engine with a by-pass means which communicates through a branch pipe with each exhaust outlet of the engine fitted with an adjusting valve and disposing an inlet manifold in said by-pass means in such a manner that it communicates with a carburetter and inlet openings as well as a controlling chamber, which is provided with a controlling valve so that by controlling this valve from the operator's room suction pressure may be exerted selectively upon the diaphragm connected with each exhaust adjusting valve by means of a linkage and thus the exhaust adjusting valves may be operated selectively. The object of this invention is to operate an engine most efficiently in an apparatus for heating an inlet manifold by the jacket of exhaust gas and thus heating the combustible mixture passing through a carburetter and aiding its carburetion, by heating an inlet pipe by the exhaust gas passing through a by-pass means instead of the exhaust gas of the main exhaust manifold, adjusting suitably the amount of the exhaust gas that passes through the by-pass means by utilizing the suction of the engine and thereby regulating the carburetion of fuel according to its nature or the operating condition of the engine. Therefore, according to the present invention it is possible to operate a gasoline engine such as the common automobile engine very economically by employing petroleum of poorer volatility than gasoline or even liquid fuel like heavy oil and carburetting their fuel mixtures properly.

Referring to the accompanying drawing which illustrates the manner of performing this invention, Figure 1 is a general view of the manifold according to the present invention;

Figure 2, a sectional end view of the same;

Figure 3, a side view of an adjusting valve and

Figure 4, a cross section of the same.

In the drawing, 1 is the main exhaust manifold; and 2, an auxiliary exhaust manifold which forms a by-path or by-pass means. In the example shown in the drawing, they are cast separately and connected rigidly by bolts 3 and 4. Each exhaust outlet 5 communicates with the above by-pass means through a branch 6. These exhaust outlets except the last ones are each provided with a cylindrical adjusting valve 7, which consists of a sleeve with one end open and the other end closed, this closed end having a valve stem 8 so as to be connected with the linkage described hereafter. Said valve is provided at its periphery with openings 9 and a blank part 10 and by its angular displacement regulates the amount of exhaust gas to be introduced into the by-pass means 2 from the main exhaust pipe 1.

An inlet manifold 11 is enclosed in the auxiliary exhaust manifold 2 and communicates with a carburetter by means of a mouth piece 12. Also, it communicates with the inlet openings of the engine by means of inlet ports 13 and further with a controlling valve chamber 15 at the outside of the auxiliary exhaust manifold 2 by a passage way 14, said chamber having therein a rotary controlling valve 16 controlled by a controlling rod 17 manually operated from the operator's room. This chamber 15 has pipes 18 which open at its periphery and communicate with diaphragm chambers 19 provided to correspond with the exhaust adjusting valves. At the periphery of the controlling valve 16 there are slots 20, 21 and 22 communicable with one or several pipe openings. A diaphragm 23 in the chamber 19 is connected to the exhaust adjusting valve by a linkage consisting of a stem 24, connecting member 25, crank 26, connecting rod 27 and crank arm 28, the latter being connected to stem 8 of the adjusting valve 7.

In this apparatus, the gas mixture from the carburetter is supplied to the engine cylinder through the mouth piece 12, inlet manifold 11 and inlet port 13 by the suction of the engine and after compression is ignited and exploded to drive the engine, when a part of the exhaust gas enters the by-pass means 11 through the branch pipes 6 and heats the inlet manifold 11 and consequently the combustible mixture which passes through it and thus helps the vaporization of this mixture.

Where there is used fuel of good carburetion like the common gasoline, the operator rotates the controlling valve 16 round its axial line with the controlling rod 17 so that the openings of the pipes 18 may be all closed by its blank wall. Then, the exhaust gas is exhausted not through the by-pass means, but through the main manifold 1 and therefore the inlet pipe does not receive any heating action, whereas when liquid fuel such as petroleum and heavy oil is employed, the operator can, at will, cause any desired number of the pipes 18 to communicate with the inlet manifold by means of the controlling valve 16, and the diaphragm 23 in the diaphragm chamber 19 which communicates with the inlet manifold will be drawn up by the suction of the engine, that is, in a manner opposite to that shown in Figure 2 and its motion will be transmitted to the adjusting valve 7 through the stem 24, connecting member 25, crank 26, connecting rod 27 and crank arm 28 and give the latter angular displacement, making the exhaust outlet 5 communicate with the by-pass means 2 and thus heating the inlet pipe to heat and carburete the mixture properly. Further, since the said angular displacement of the adjusting valve varies according to the degree of the suction of the engine, the amount of the exhaust gas passing through the by-pass means is regulated automatically by opening one or both of the openings 9 and 10 of this valve according to the operating condition of the engine, so that the evaporation of the mixture may be regulated to meet that condition. In this way, it is possible to drive the engine with cheap fuel very economically.

I claim:

1. In a manifold having an auxiliary or by-pass manifold and adapted for use with an internal combustion engine having a plurality of cylinders, the auxiliary manifold having a plurality of ports individually communicating with exhaust ports upon said cylinders, the combination of individual control valves for directly controlling at least several of said exhaust ports, there being an intake manifold communicating with intake ports upon the cylinders and being closely associated with said by-pass manifold, a manually operated control valve communicating with said intake manifold, a plurality of enclosed diaphragms having mechanical connections linking said diaphragms individually to the control valves for the exhaust ports so as to operate said valves upon movement of said diaphragms, conducting means for communicating the low pressure or suction prevailing in the intake manifold individually to said diaphragms in order to move the same according to the degree of suction, and means upon said manually controlled valve for controlling said conducting means and selectively cutting off controlling or fully opening communication between the intake manifold and said diaphragms.

2. In a manifold having an auxiliary or by-pass manifold and adapted for use with an internal combustion engine having a plurality of cylinders, the auxiliary manifold having a plurality of ports individually communicating with exhaust ports upon said cylinders, the combination of individual control valves for directly controlling at least several of said exhaust ports, there being an intake manifold communicating with intake ports upon the cylinders and being closely associated with said by-pass manifold, a plurality of enclosed diaphragms having mechanical connections linking said diaphragms individually to the control valves for the exhaust ports so as to operate said valves upon movement of said diaphragms, conducting means for communicating the low pressure or suction prevailing in the intake manifold individually to said diaphragms in order to move the same according to the degree of suction, and a manually operable valve associated with and selectively controlling the conducting means between the intake manifold and the diaphragms for the purpose of individually and selectively, or in groups, controlling the communication of any degree of suction from the intake manifold to the several control valves associated with the exhaust ports.

SONOSUKE YAMASHITA.